United States Patent [19]
Frigo et al.

[11] Patent Number: 5,808,764
[45] Date of Patent: Sep. 15, 1998

[54] MULTIPLE STAR, PASSIVE OPTICAL NETWORK BASED ON REMOTE INTERROGATION OF TERMINAL EQUIPMENT

[75] Inventors: Nicholas J. Frigo, Atlantic Highlands; Patrick P. Iannone, Edison, both of N.J.

[73] Assignee: Lucent Technologies, Inc., Murray Hill, N.J.

[21] Appl. No.: 580,239

[22] Filed: Dec. 28, 1995

[51] Int. Cl.[6] .......................... H04C 14/02; H04B 10/207
[52] U.S. Cl. .......................... 359/127; 359/121; 359/125; 359/168
[58] Field of Search .................................... 359/120, 121, 359/125, 127, 130, 168

[56] References Cited

U.S. PATENT DOCUMENTS

| | | | |
|---|---|---|---|
| 4,556,279 | 12/1985 | Shaw et al. | 350/96.15 |
| 4,775,971 | 10/1988 | Bergmann | 359/168 |
| 5,373,386 | 12/1994 | Bolze | 359/125 |
| 5,457,760 | 10/1995 | Mizrahi | 359/127 |
| 5,504,606 | 4/1996 | Frigo | 359/168 |
| 5,521,734 | 5/1996 | Frigo | 359/125 |

FOREIGN PATENT DOCUMENTS 0249056  12/1987  European Pat. Off. ............... 359/121

OTHER PUBLICATIONS

Welzenvach et al, "The Application of Optical Systems For Cable TV", NTG–Fachver (Germany), vol. 73,pp. 46–50, 1980.

*Primary Examiner*—Leslie Pascal

[57] ABSTRACT

A multiple star implementation of RITE-Net™ type structure is implemented hereby. The structure provides an economical way of introducing PONs by serving a greatly increased number of subscribing ONUs for each fiber leaving the central office. Accordingly, the fiber gain reduces the installation cost of the fiber plant by reducing the average run length. Additionally, the larger number of subscribers reduce the average cost per subscriber for a laser at the central office.

24 Claims, 12 Drawing Sheets

MULTIPLE STAR, PASSIVE OPTICAL NETWORK BASED ON REMOTE INTERROGATION OF TERMINAL EQUIPMENT

BACKGROUND OF THE INVENTION

1. Field of the Invention

The present invention relates to passive optical networks capable of providing tertiary and higher level passive star distribution with RITE-Net™-based optical network units.

2. Description of the Related Art

The current telephony network is a highly reliable switched network. The network's low transmission bandwidth, however, limits its ability to evolve and incorporate emerging technologies to implement expanding services, e.g., bidirectional video, high definition television (HDTV), etc. The bandwidth, switching and processing demands required to deliver the expanding services has prompted the development and introduction of passive optical networks (PONs) within the switched network architecture. Passive optical networks are optical transmission systems that require no active components to direct optical signals between a central office (or host digital terminal), and a network subscriber's terminal equipment. Accordingly, PONs can provide the high capacity and high speed transmission infrastructure required for emerging technologies. The cost of introducing optical fiber, however, either in lieu of copper wire or as a copper wire replacement is high.

A passive optical communication network will typically include a central office from which extends a plurality of optical fibers forming a primary star. The optical fibers extend from the central office to each of a plurality of remote nodes. Each remote node is central to each of a plurality of secondary stars formed of second pluralities of optical fibers. Each optical fiber in each of the second pluralities of secondary stars links each remote node to one of a plurality of optical network units. In one well-known PON architecture, the central office broadcasts a common signal to all end users. Information is segregated within the common broadcast signal in individual time slots as a time division multiplexed (TDM) signal. Star couplers located at each remote node distribute the broadcast signals to the optical network units. Upstream information is transmitted from each optical network unit within its particular timeslot. The upstream TDM signals are received at each remote node and time division multiplexed to form an upstream signal. The multiplexed upstream signal is directed to the central office. Management of collisions in time and the tradeoff between delivered optical power and the number of users, however, limits competitive deployment of conventional broadcast (TDM) passive optical networks.

Alternatively, optical information may be wavelength segregated within optical signals traversing a passive optical network. In a wavelength division multiplexing (WDM) scheme, the central office assigns each optical network unit a unique wavelength (or wavelength band). Optical information transmitted downstream from the central office is directed to the optical network units via one of a plurality of remote nodes according to wavelength or wavelength band. The remote nodes implement the directing by first optically demultiplexing received downstream signals into a number of wavelength-specific signal portions. The demultiplexed signal portions are then distributed by wavelength by the remote node to each optical network unit. For upstream transmission, each optical network unit includes a separate transmitter at the ONU's assigned wavelength. Upstream signals are transmitted thereby to the remote node, multiplexed into a composite signal and transferred to the CO. While WDM PONs have superior power budgets in principle because all the light intended for a subscriber is directed thereto, implementation of WDMs PONs is quite costly. Variations on the WDM scheme are numerous, such as U.S. Pat. No. 5,351,146, to Chan et al., which requires a complicated signal processing and signal-distribution hardware located at the ONU level.

RITE-NET™ is a passive optical network disclosed in commonly owned U.S patent application Ser. No. 08/029,724, filed Mar. 1, 1993, and incorporated herein by reference. RITE-Net™ utilizes a wavelength division multiplexing scheme which avoids the need for individual optical sources (i.e., transmitters) at each optical network unit, lowering system implementation cost. Within RITE-Net™, each optical network unit receives wavelength-specific portions of downstream light signals, demultiplexed and routed by a WDM router (WDM/R or WGR) located at a remote node. Part of the wavelength-specific signal portion received at each optical network unit is overmodulated with upstream data and looped back to the remote node. The remote node multiplexes the received overmodulated portions into an upstream signal and directs the signal (by the WDM/R) to the central office. While a modulator is required at each optical network unit, an optical source is not, rendering the RITE-Net™ architecture intrinsically robust and serviceable. Further, by not using individual transmitters at the optical network units, the need for wavelength registration and stabilization of optical network unit sources is avoided.

While RITE-Net™ provides the WDM performance potential at reduced cost, implementing RITE-Net™ into existing infrastructure is still quite costly. Thus, there exists a need for further reducing the projected cost per end user for introducing fiber into the loop, preferably as a WDM RITE-Net™ system. In other words, there is a need for increasing the number of end users for each fiber leaving a central office (i.e., high fiber gain) whereby the fiber implementation cost per user is concomitantly reduced. The high fiber gain would also reduce implementation cost of the fiber plant by reducing the average run length to each subscriber as well as the cost per subscriber for the central office laser and electronics.

SUMMARY OF THE INVENTION

The present invention provides a multiple star, passive optical network, the structure of which is based on a RITE-Net™ design, the long-term projected implementation costs of which are reduced relative thereto. The multiple star structure of the invention provides a basis for introducing fiber into the loop in stages, depending on varying system need. The system implementation cost, therefore, may also be incurred in stages. A complete and full implementation of the multiple star structure will provide a minimum number of fibers emanating from a central office or host computer for a maximum number of end users per fiber. Accordingly, the number of users associated with each fiber leaving the central office (each of the plurality of fibers forming the primary star) is increased relative to conventional double-star PONs by the invention, or, the number of fibers leaving the central office may be drastically reduced while serving the same number of end users. This provides for considerable savings per end user on the cost of equipment required at the central office.

The multiple star, passive optical network of this invention includes three or more star signal distribution levels or tiers. A primary fiber star embodies, at a central office, one or more transmitting lasers which are linked by a plurality of optical fibers to each of a plurality of first-order remote nodes. The first-order remote nodes each include second pluralities of optical fibers (as secondary fiber stars) which extend to each of a plurality of optical transceivers (i.e., optical network units) and/or a plurality of second-order remote nodes. Each second-order remote node extends via a third plurality of optical fibers as a tertiary star.

The optical signal distribution or routing occurring within the secondary and tertiary stars is preferably implemented by first- and second-order wavelength grating routers (WGRs), located respectively at the first- and second-order remote nodes. However, the structural positions that first- and second-order WGRs would normally take in the preferred embodiment may be initially filled with optical transceivers (optical terminations) to keep the initial cost of implementing the "complete" optical structure to a minimum. In other words, one of the benefits of the invention is that portions may be first implemented via copper or coaxial cable, which is cheaper to implement today, and when the system need arises or the price drops, optical terminations can be later replaced by WGRs. The optical transceivers are preferably based on the RITE-Net™ design.

In one embodiment, a multiple star PON of this invention includes at least one primary or first-order optical node, each of which includes a first-order waveguide grating router (WGR) defining $N_1$, channels with channel spacings approximately equal to $\Delta\lambda_1$. Each primary optical node is preferably optically linked to a central office or host computer terminal for the exchange of upstream/downstream optical signals therebetween. Each primary optical node is also optically linked to one or more secondary or second-order optical nodes (a secondary star), each of which includes a second-order optical router defining $N_2$ channels with channel spacings approximately equal to $\Delta\lambda_2$. Each second-order optical node also includes a plurality of optical fibers extending therefrom as a tertiary star. Both the first-order and second-order optical routers, located respectively at the primary and secondary optical nodes, may be optically linked to one or more optical transceivers or terminations.

Each of the first and second-order optical routers includes ports for inputting/outputting upstream/downstream optical signals, as well as means for demultiplexing downstream signals received thereat into a plurality of optical signals. Multiple upstream optical signals are multiplexed at first- and second-order optical routers to form composite upstream optical signals.

In a preferred embodiment, the channel spacing $\Delta\lambda_1$, of the first-order optical router may be substantially an integer multiple of the channel spacing $\Delta\lambda_2$ of the second-order optical router such that $\Delta\lambda_1$ approximately equals $N_2\Delta\lambda_2$, where $N_2$ equals an integer number of channels defined by the second-order optical router. Thereby, each wavelength band emitted from each output port of the first-order router would include $N_2$ contiguous wavelength bands (defined with channel spacings $\Delta\lambda_2$), which are in turn demultiplexed to $N_2$ separate output ports of a secondary router. This can be referred to as the "coarse/fine" implementation. A "fine/coarse" structure could also be implemented which case would include a first order optical router with a channel spacing $\Delta\lambda_1$ that is $1/N_2$ the channel spacing $\Delta\lambda_2$ of the second order optical router. A "vernier" case would find the relationship between the number of channels and the channels spacings of the first and second order optical routers to be a non-integer ratio. In addition, a case where the channel spacings defined by the first- and second-order optical routers are "equal", but the number of channels defined by each differ, could also be implemented to allow a multiple star structure of this invention.

BRIEF DESCRIPTION OF THE DRAWING FIGURES

DETAILED DESCRIPTION OF THE PREFERRED EMBODIMENTS

Figure 1:
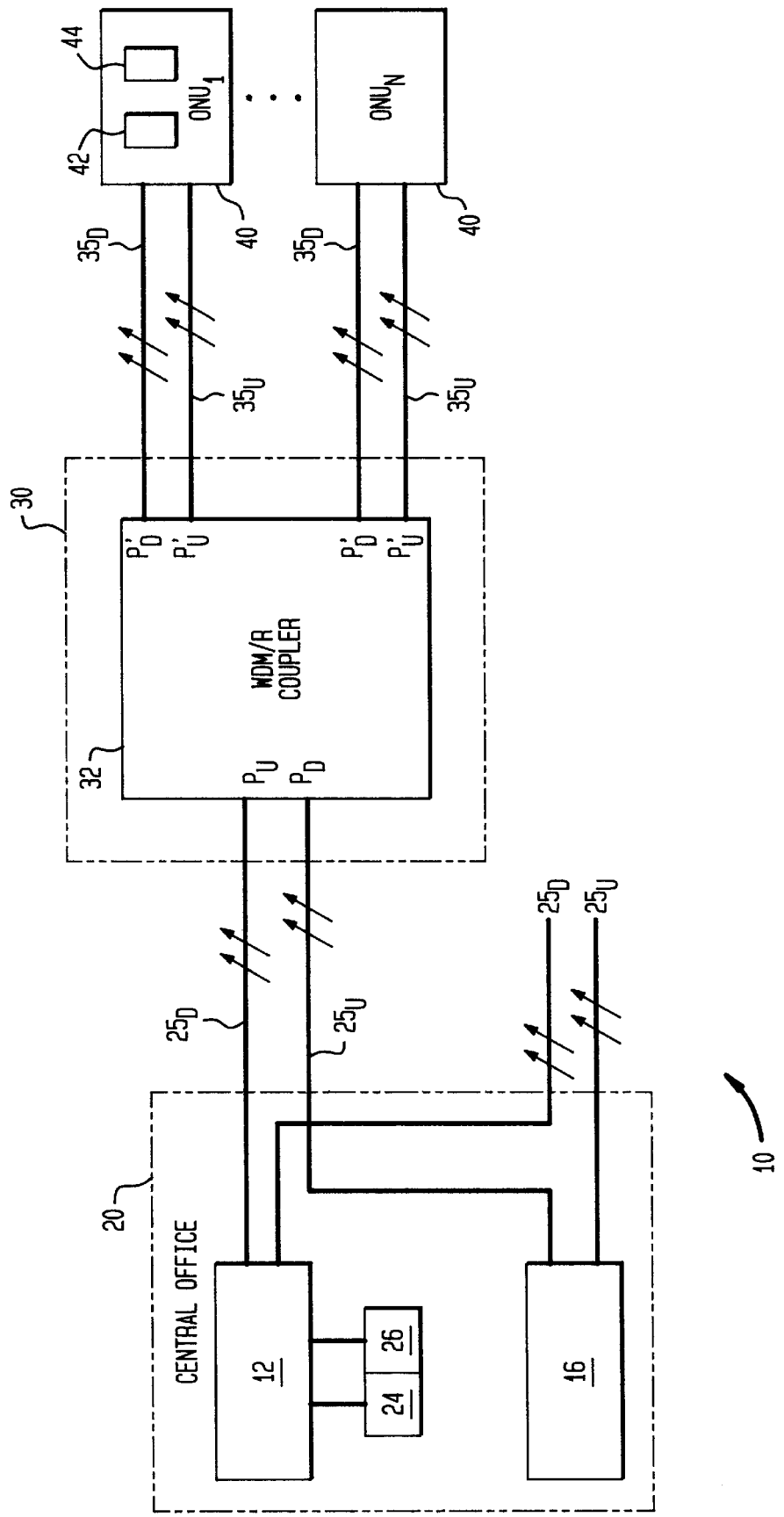
FIG. 1 is a schematic block diagram of a RITE-Net architecture of the prior art.

A conventional RITE-Net™ double star, or passive optical network 10, is shown in FIG. 1. The network includes a multi-wavelength or frequency-tunable transmitter 12 (e.g., a laser) and a receiver 16 disposed at a central office 20. An electronic sequencer 24 and a control circuit 26 included at the central office define the laser's transmitting wavelength to ensure that data for transmission modulates the laser at the correct wavelengths. The laser encodes optical information into wavelength division multiplexed (WDM) signals for selective transmission downstream upon fibers $25_D$. Together, the central office and fibers extending therefrom are referred to as a primary star. Each downstream fiber $25_D$ links the central office to a remote node 30. The laser mode spacing (i.e., the frequency separation between successive output wavelength bands of a single laser) is also designed to closely match the mode spacing of the wavelength division multiplexer/routers (WDM/R)[1], which are located at each remote node, referred to interchangeably herein as waveguide grating routers 32 (WGRs). Each WGR includes a plurality of fibers which extend from it to a plurality of optical terminations as a secondary star.

[1]Dragone et al., Integrated N×N Multiplexer On Silicon, IEEE Photon. Technol. Lett., 3, pp. 896–899 (1991); Zirngibl et al., A 12-Frequency WDM Laser Source Based On A Transmissive Waveguide Grating Router, Electronics Letters (1994).

Each WGR 32 (resident at each remote node) demultiplexes downstream light signals received thereat to form a number of downstream signal portions and directs the same to the optical terminations. For example, a WGR may demultiplex a downstream signal into N signal portions, each displaying a channel spacing of $\Delta\lambda_1$. The WGR routs each of the N downstream signal portions to each of a plurality of optical network units 40 (via downstream fibers 35$_D$) according to wavelength or wavelength band. The downstream signal portions arriving at each optical network unit are generally split within a tap coupler 42 into two or more signal portions. A split portion of the incoming downstream light signal portion is overmodulated (imprinted) with subscriber data within a modulator 44, and looped back to the remote node 30 via fibers 35$_U$. At the remote node, split, imprinted, upstream signal portions are combined (multiplexed) to form an upstream optical signal that is further directed to the central office 20.

Figure 2:
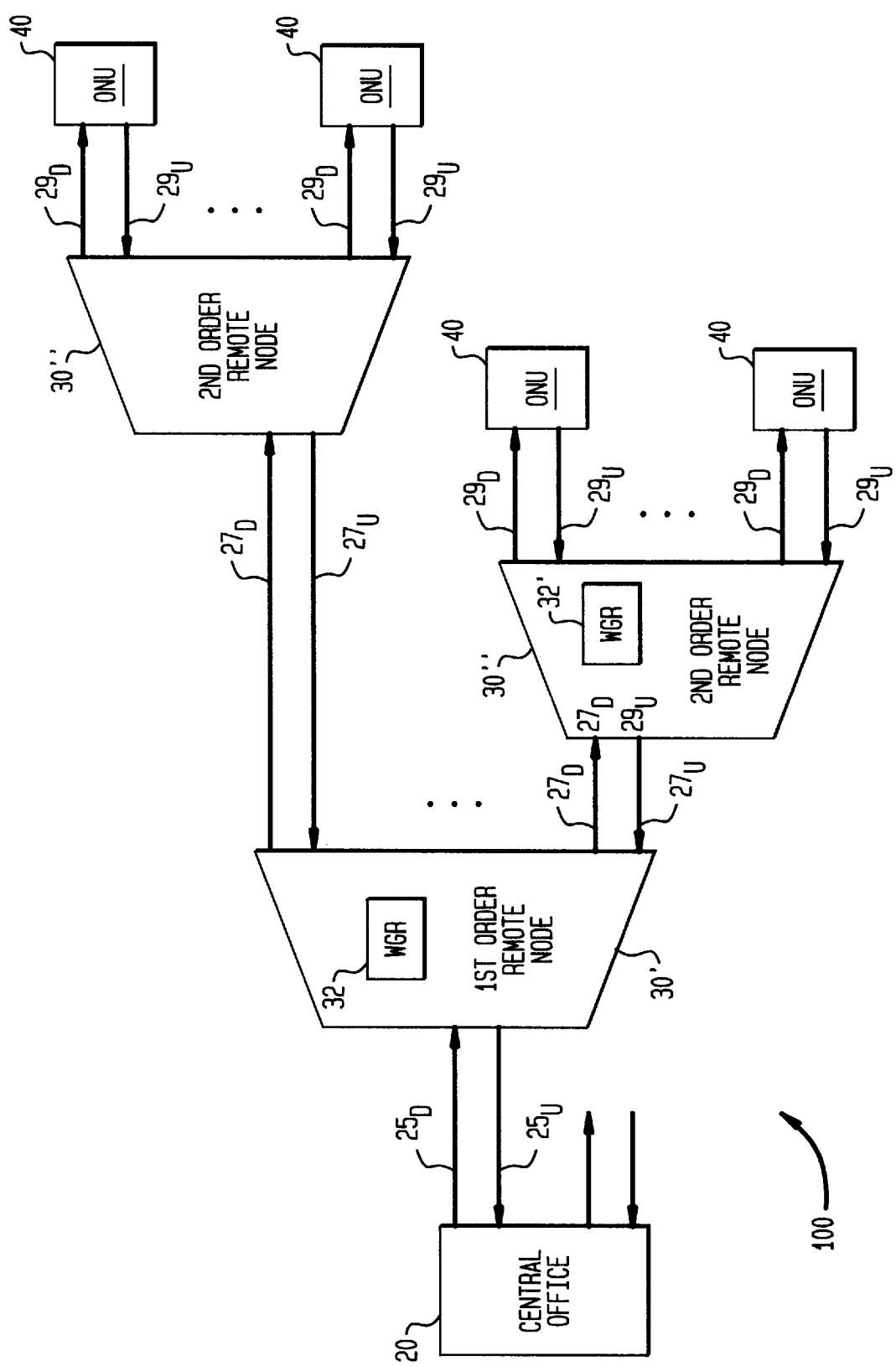
FIG. 2 is a schematic block diagram of a multiple Star Network of this invention.

A multiple star, passive optical network 100 of this invention is shown in FIG. 2. While there are three levels or tiers shown in the figure, the depiction is for illustrative purposes only and is not meant to limit the scope of this invention to a tertiary star network. Because of its unique structure, the network 100 provides the flexibility, power requirements, upgrade potential and OAMP properties of a conventional RITE-Net™ system, at a substantially reduced cost per end user for the network's implementation. The multiple star network includes at least three star levels, enabling each fiber forming the primary star to serve an increased number of users relative the number of users per fiber for conventional double star PONs (i.e., RITE-Net™ PONs). The network's versatility allows for fiber to be introduced into the local loop by layers, i.e., a basis for successive pushes of fiber-borne signals further into the loop. The increased fiber gain reduces the installation cost of the fiber plant by reducing the average run length to each end subscriber. In addition, the larger number of subscribers reduces the average cost per subscriber for the central office transmitter (i.e., laser) and electronics per user.

Network 100 includes a central office 20 optically linked via fibers 25$_D$, 25$_U$, to each of a plurality of first-order remote nodes 30', forming a primary star. Downstream light signals arriving from the central office at the first-order remote nodes 30' are demultiplexed by wavelength or wavelength band by a wavelength grating router (WGR) 32 contained therein. The demultiplexing creates a plurality of first-order downstream signals. The first-order downstream signals are routed by the first-order WGR to each of the plurality of second-order remote nodes 30" via a plurality of optical fibers 27$_D$ (i.e., a plurality of secondary stars). Each second-order remote node 30" includes a second-order WGR 32' for demultiplexing each downstream first-order signal received there to form a plurality of second-order downstream signals. The second-order WGR then routes the second-order downstream signals (as a tertiary star) by wavelength to the optical network units (ONUs) 40 (referred to interchangeably as optical transceivers). While the ONUs are considered to be the final optical destination, it is possible that one ONU can serve more than one living unit (i.e., end subscriber). As mentioned above, however, each first-and second-order remote node may be initially replaced at system implementation by optical transceivers (at the ONUs) to minimize initial capital expenditure for the system. Each optical transceiver may terminate the optical transmissions directed thereto while further directing the optical information within a copper plant (or coaxial cable) extension.

Figure 3A:
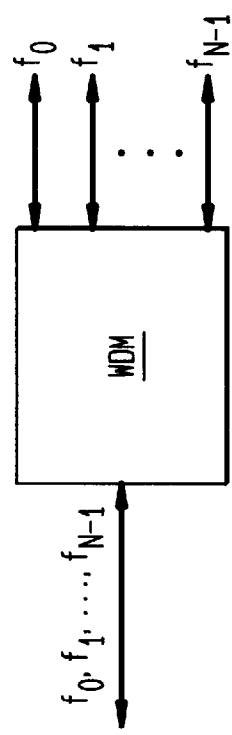
FIG. 3A and 3B are schematic diagram of a WDM and a WDM/R device, respectively.
Figure 3B:
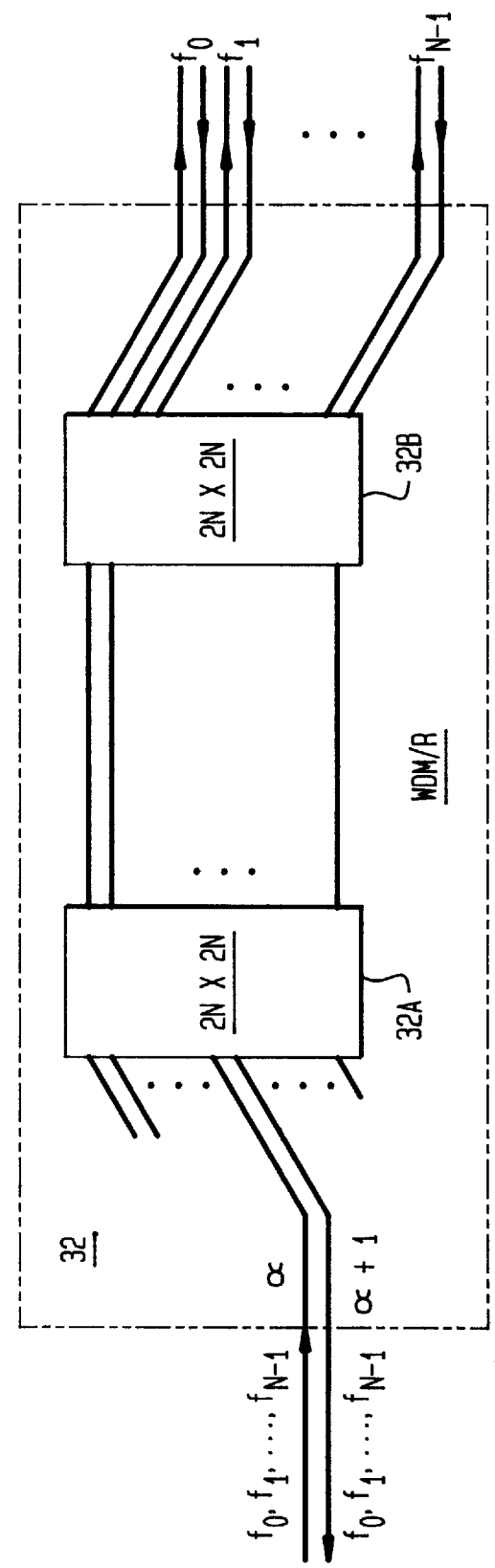

The advantages of the multiple-star, passive optical network 100 are possible because of the properties of the "Dragone" router (WGR). The WGRs, identified as 32 and 32' at first and second-order remote nodes 30' and 30" of FIG. 2, respectively, provide for a wide range of channel spacings, $\Delta\lambda$, for segregating optical data by wavelength within an optical signal. FIGS. 3A and 3B show, respectively, a schematic representation of a conventional 1×N coupler and a back-to-back star coupler envisioned by Dragone, i.e., WGR 32. The WGR is created by connecting two planar guide N×N star couplers (32A and 32B using a double-fiber example), back to back, with precisely tailored lengths for each of the connection paths between the N×N star couplers. Each sequential path is longer than the path below it, imposing a fixed phase delay, to form a frequency-specific channel. Optical signals received at one of the input ports of the first star coupler 32A substantially uniformly illuminate each of N intermediate ports as in a diffraction instrument. In transporting the optical field between the two star couplers, i.e., between couplers 32A to 32B, the graded optical path lengths import a uniformly spaced phase difference to the fields. An equivalent slit device at the input surface of the second coupler 32B changes the angle of light propagation, in much the same way that a diffraction grating or phased array antenna will impose phase differences. Consequently, the WGR output ports (the 32B ports) from which light is directed depend on both the input port (the 32A ports) and the optical frequency. This property is sometimes referred to as the "routing" property.

Another property of WGR 32 is the "periodicity property". If signal portions displaying wavelengths $\lambda_0$ through $\lambda_{N-1}$ exit ports 1 through N, then signal portions displaying wavelengths $\lambda_N$ through $\lambda_{2N-1}$ will also exit the respective ports, as will signal portions displaying wavelengths $\lambda_{2N}$ through $\lambda_{3N-1}$, etc., by induction. In other words, a WGR behaves like a grating for which each higher order is overlaid on the order before it. Although dispersion will gradually change the channel spacings, $\Delta\lambda$, as the order increases, the periodicity is approximately uniform over a limited range of orders. The wavelengths exiting the j$^{th}$ port ($\lambda_j$, $\lambda_j+N\Delta\lambda$, $\lambda_j+2N\Delta\lambda$, . . . ) are thus spaced by the free-spectral range, $N\Delta\lambda$. Free spectral range is essentially the number of channels times the wavelength spread of each channel.

To provide diversity of a WGR routing table, the wavelength characteristics of the WGRs, e.g., first-order WGR 32 located at one or more of the first order remote nodes (central to the secondary stars), must differ from those of the second-order WGRs, e.g., WGRs 32' located at one or more of the second-order remote nodes (central to the tertiary stars). If the wavelength characteristics were identical, then all the downstream second-order signals entering each second-order WGR 32' would exit from a single port since the source of the first-order downstream signals are a single port of first-order WGR 32. However, a secondary splitting within the incoming first-order downstream signals can take place if there is a difference in the free spectral ranges $N_1\Delta\lambda_1$ and $N_2\Delta\lambda_2$ of the first and second-order WGRs, 32 and 32', respectively.

Figure 4A:
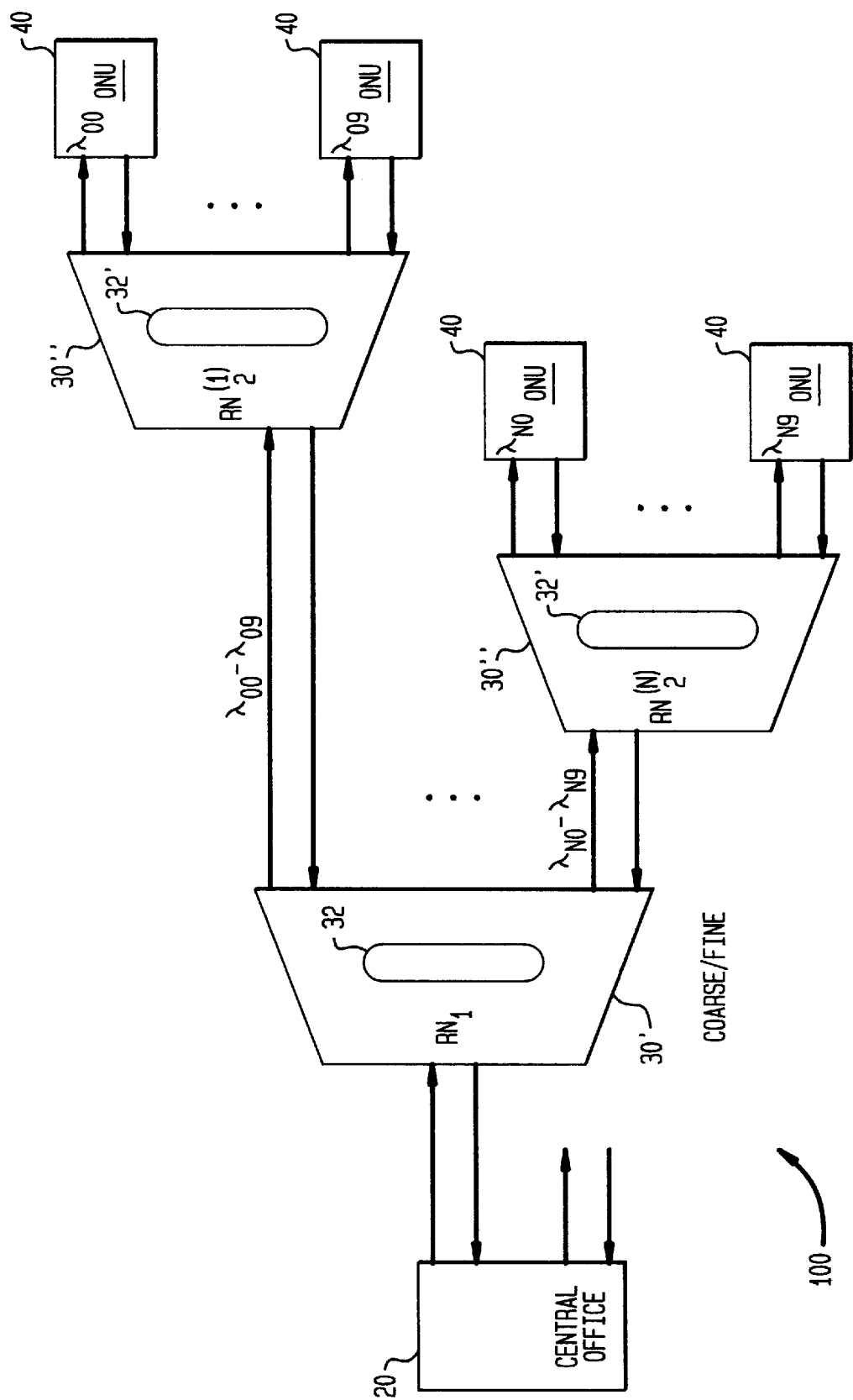
FIG. 4A is a schematic diagram highlighting a configuration of the invention within which "coarse/fine" operation is implemented.
Figure 5:
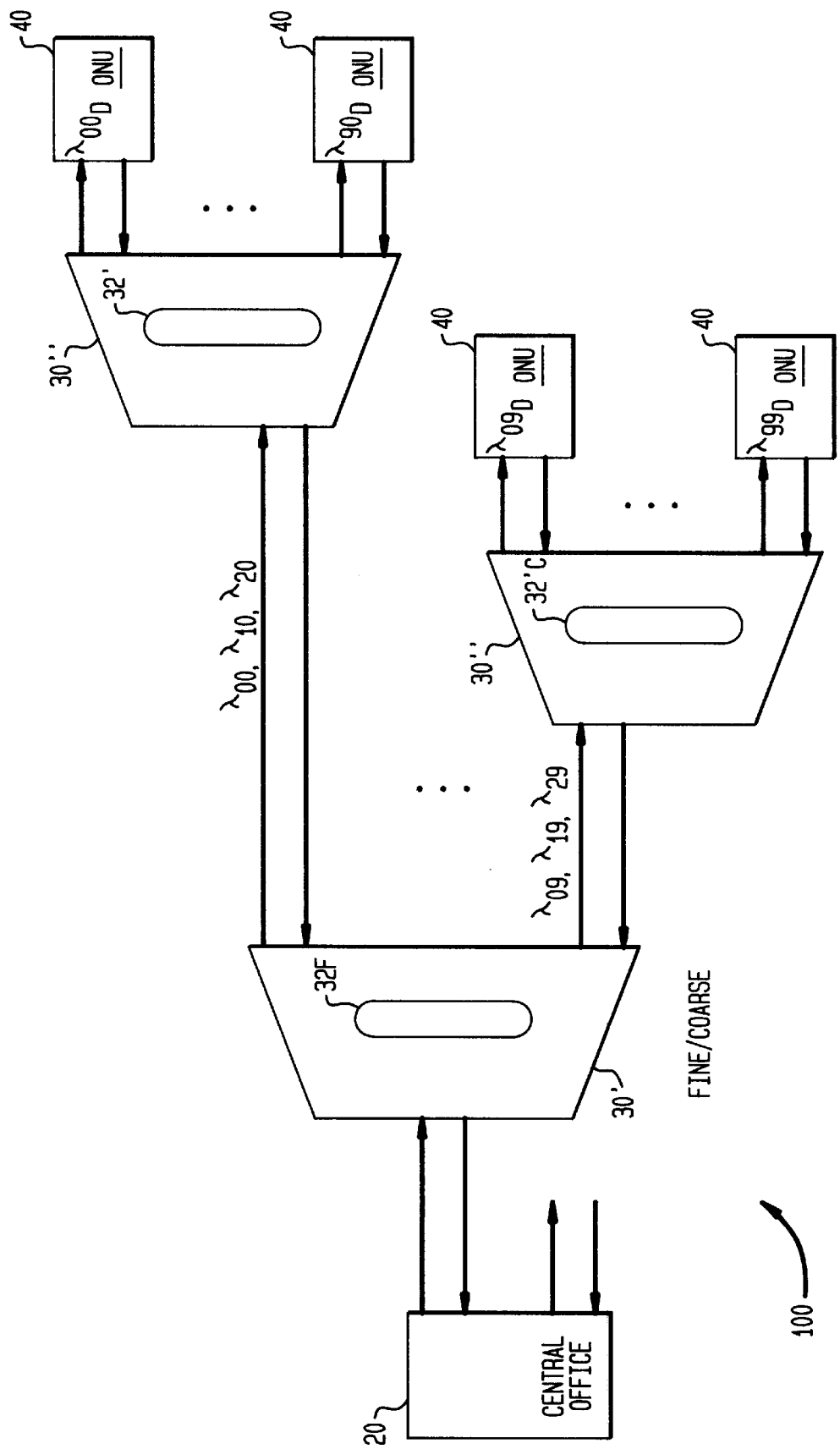
FIG. 5 is a schematic diagram highlighting a configuration within which "fine/coarse" operation is implemented.

Four configurations of the present invention will be described in which differing order WGRs (i.e., first- and second-order WGRs) will display differing free spectral ranges, i.e., $N_1\Delta\lambda$ vs. $N_2\Delta\lambda_2$. The first configuration is depicted in FIG. 4A and is referred to as "coarse/fine". Within the "coarse/fine" configuration, the first-order WGR 32 displays a much larger channel spacing than that channel spacing of the second-order WGR 32'. The second configuration is depicted in FIG. 5 and is referred to as "fine/coarse", the reverse or inverse of the "coarse/fine" configuration. The third configuration is depicted in FIGS. 6A–6D, and is referred to as the "vernier" configuration. In the "vernier" configuration, the difference in the channel spacings of the first- and second-order WGRs 32, 32', respectively, is slight, i.e., $\Delta\lambda_1 \approx \Delta\lambda_2$. In the first three configurations, both the number of channels and each channel's spacing of the different order WGRs differs. The fourth configuration is depicted in FIG. 7 and referred to as the "equal channel spacing" configuration. Within the equal channel spacing configuration, each first-order and second-order WGR displays equal channel spacings ($\Delta\lambda_1$ equals $\Delta\lambda_2$) but different free spectral ranges ($N_1\Delta\lambda_1$ does not equal $N_2\Delta\lambda_2$).

Figure 4B:
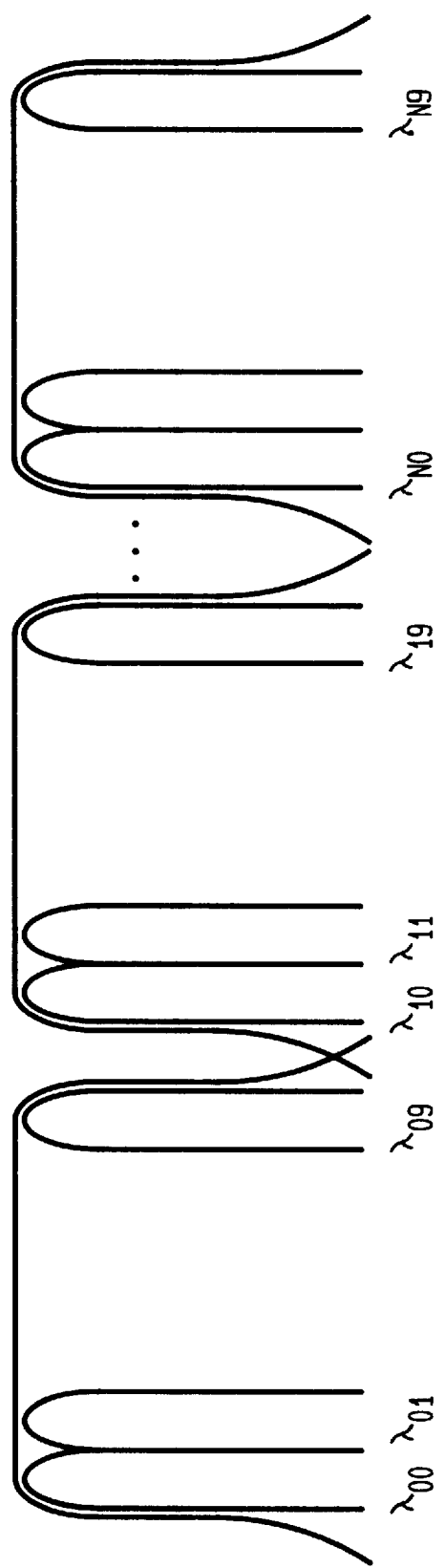
FIG. 4B is a diagram depicting the wavelength content of the coarse wavelength bands of the "coarse/fine" operation.

In the "coarse/fine" configuration,[2] (FIGS. 4A and 4B) the channel spacing at the first-order WGR 32 is an integer multiple of the channel spacing within the second-order WGR 32' positioned at the second-order remote node 30". More particularly, WGR 32 is a coarse $N_1 \times N_1$ WGR with channel spacing $\Delta\lambda_1$; WGR 32' is a fine $N_2 \times N_2$ WGR with channel spacing $\Delta\lambda_2$, where $\Delta\lambda_1$ equals $N_2 \Delta\lambda_2$. For example, a first-order, $N_1$-channel WGR with a channel spacing $\Delta\lambda_1$ that is ten times the channel spacing $\Delta\lambda_2$ ($\Delta\lambda_1 = 10\Delta\lambda_2$) of a second-order WGR creates $10N_2$ wavelength bins for downstream distribution. If $N_2$ is 10 for the second-order WGR, 100 unique wavelength bins are available to serve 100 ONUs in a multiple star structure fed by a single fiber extending from the central office. The bins are separated by the amount of the fine channel spacing. In general, disregarding dispersion,[3]

$$\lambda_{ij} = i\Delta\lambda_1 + j\Delta\lambda_2 = \lambda_{00} + (N_2 i + j)\Delta\lambda_2$$

where the indices i and j represent the output ports of the coarse and fine WGRs, respectively. FIG. 4B shows an idealized view of the first channels for the coarse WGR 32 (first-order remote node 30') for the example described above. The first channel passes signals of wavelengths $\lambda_{oj}$, i.e., $\lambda_{00}$ through $\lambda_{09}$, while the second channel passes signals of wavelength $\lambda_{ij}$, i.e., $\lambda_{10}$ through $\lambda_{19}$, etc. The first-order signals exiting the first port of the first-order WGR 32 (coarse) arrive at the first of the second-order (fine) WGRs 32'. Each of the $j^{th}$ second-order signals displaying wavelengths $\lambda_{ij}$'s exit on distinct ports of the second-order WGR 32'. Therefore, each of the first $N_1 \times N_2$ wavelengths has a unique path to each of the first $N_1 \times N_2$ subscribing ONUs along one fiber extending from the central office 20 through first-order and second order remote nodes 30' and 30", respectively.

[2]For simplicity, the descriptions of the multiple star configurations ignore upstream fibers without loss of generality.
[3]System channels are defined herein in terms of wavelength although each WGR is more naturally described using optical frequency.

The second or "fine/coarse" configuration is shown in FIG. 5. The "fine/coarse" configuration is similar to the "coarse/fine" configuration described above, but the routing diagram is different. The first-order remote node 30' includes a "fine" $N_1 \times N_1$ WGR 32F with channel spacing $\Delta\lambda_1$; the second-order remote node 30" includes a coarse $N_2 \times N_2$ WGR 32'C with channel spacing $\Delta\lambda_2$ equal to $N_1 \Delta\lambda_1$. Again, considering 100 wavelength bins, first-order downstream signals embodying the first j or 10 fine wavelengths, i.e., $\lambda_{oj}$, of the "fine/coarse" configuration are routed through the first ten output ports of the first-order (fine) WGR 32F. Each of the $i^{th}$ order fine wavelengths are directed out the first port of the first-order fine WGR 32F, i.e., $\lambda_{io}$. Each $\lambda_{io}$ is received at the second-order, or coarse, WGR 32'C, where they are distributed out the i ports as second-order signals. The general relationship between the wavelength bins (again disregarding dispersion) is $$\lambda_{ij} = \lambda_{00} + i\Delta\lambda_2 + j\Delta\lambda_1 = \lambda_{00} + (N_1 i + j)\Delta\lambda_1$$

where i and j again represent the output ports of the coarse and fine WGRs, respectively. Adjacent output ports in the second-order remote nodes 30" (coarse WGR 32'C) correspond to wavelengths separated by the periodicity of WGR 32F at the first-order remote node 30'. The result is in contrast with the previous case, where signals at the first 10 wavelengths exited the first port of the first-order ("coarse") WGR 32 to cause the full cycle (of j signals) to exit the ports of the second-order ("fine") WGR 32'. In either case, there is a unique routing path for each of the 100 subscribers supplied from the first-order remote node 30' as the secondary star.

The wavelength plan for the "vernier" case will be explained with reference to FIGS. 6A, 6B, 6C and 6D. Vernier is meant to suggest the same basic principle used in vernier measuring gauges. Concomitantly, the ratio of the wavelength channel spacings of first order WGRs 32V at first-order remote node 30' ($RN_1$) to channel spacing of the second-order WGR 32'V at the second-order remote note 30" ($RN_2$) is $\Delta\lambda_1/\Delta\lambda_2 = I/J$, with I and J being distinct integers chosen such that neither are integer multiples of the other such as 10 and 11. In other words, $\Delta\lambda_1$ MOD $\Delta\lambda_2$ does not equal zero. FIGS. 6B, 6C and 6D show the wavelength combs at several of the ports of the WGRs in the vernier case. The first and second-order WGRs 32V and 32'V include $N_1$ and $N_2$ channels, respectively, where $N_1 = 11$ and $N_2 = 9$.

Figure 6A:
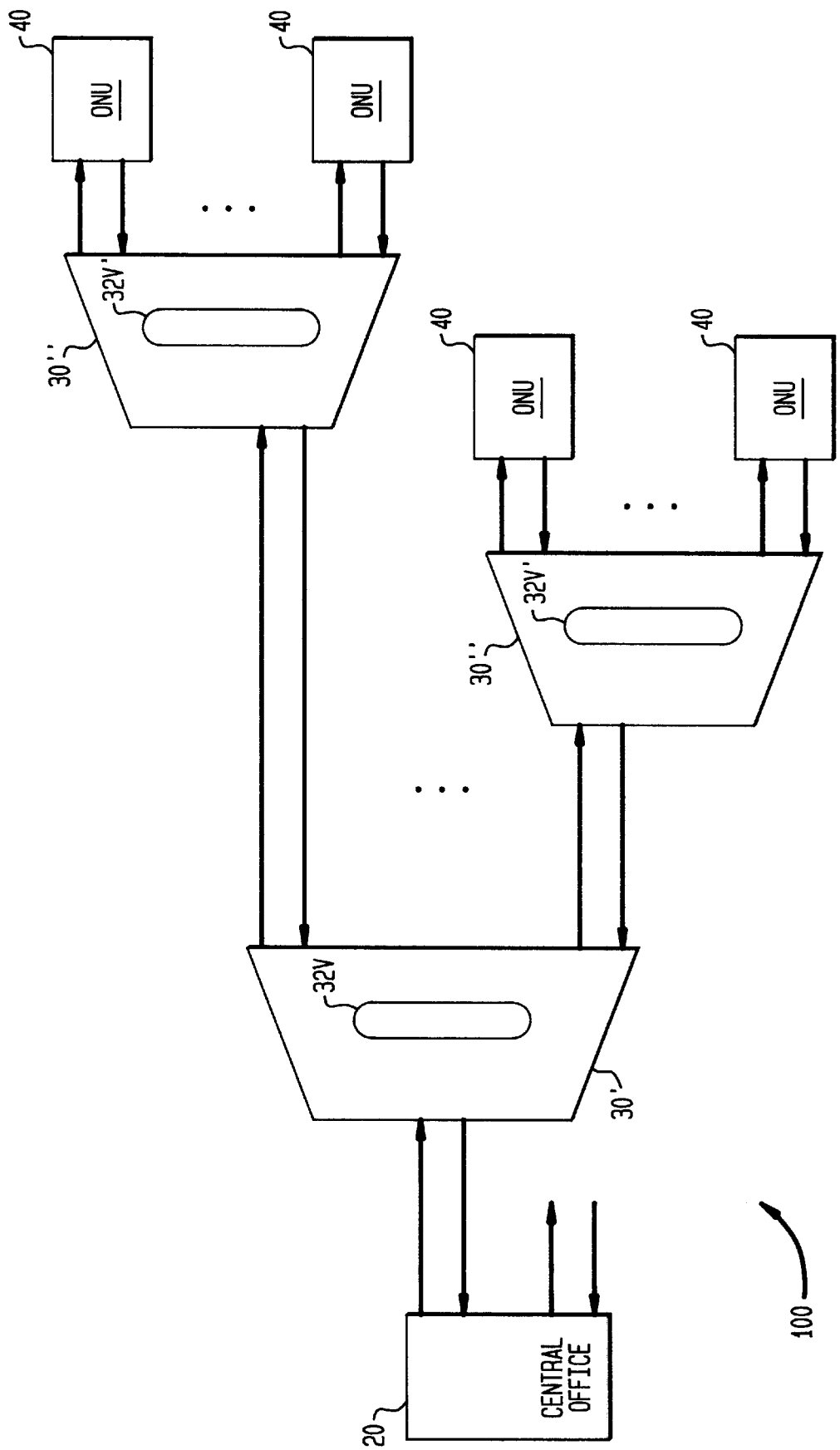
FIG. 6A is a schematic diagram highlighting a configuration within which a "vernier" operation is implemented.
Figure 6B:
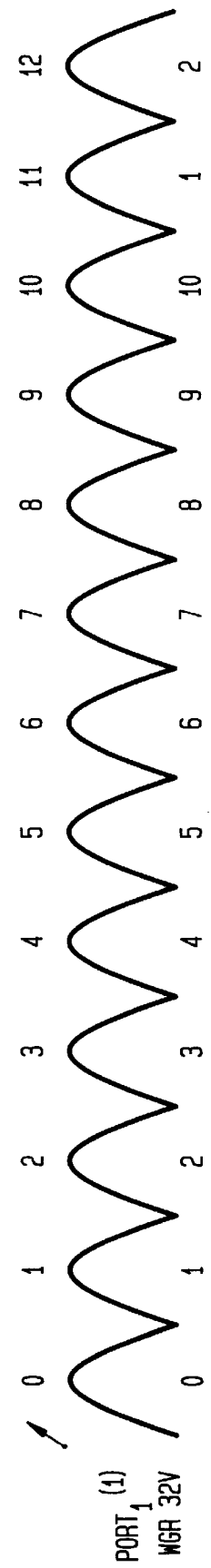
FIGS. 6B, 6C and 6D identify wavelength combs for first or/and second-order remote nodes within the present invention.
Figure 6C:
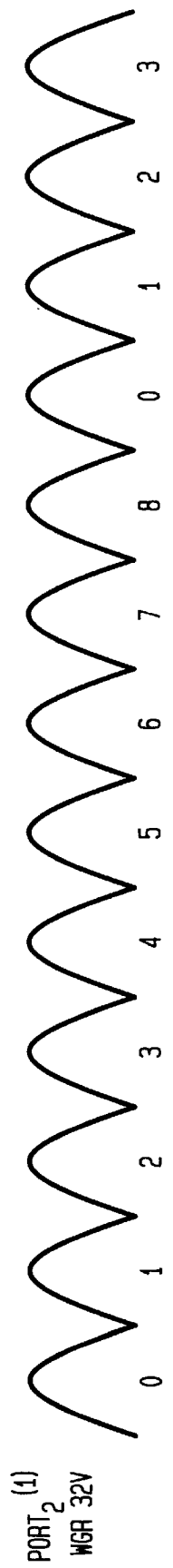
Figure 6D:
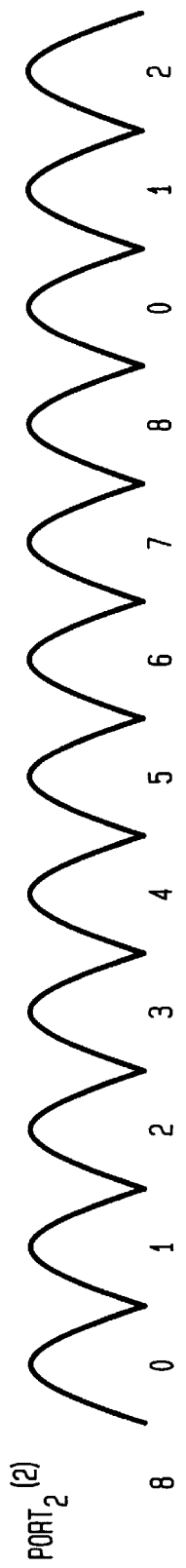
Figure 7:
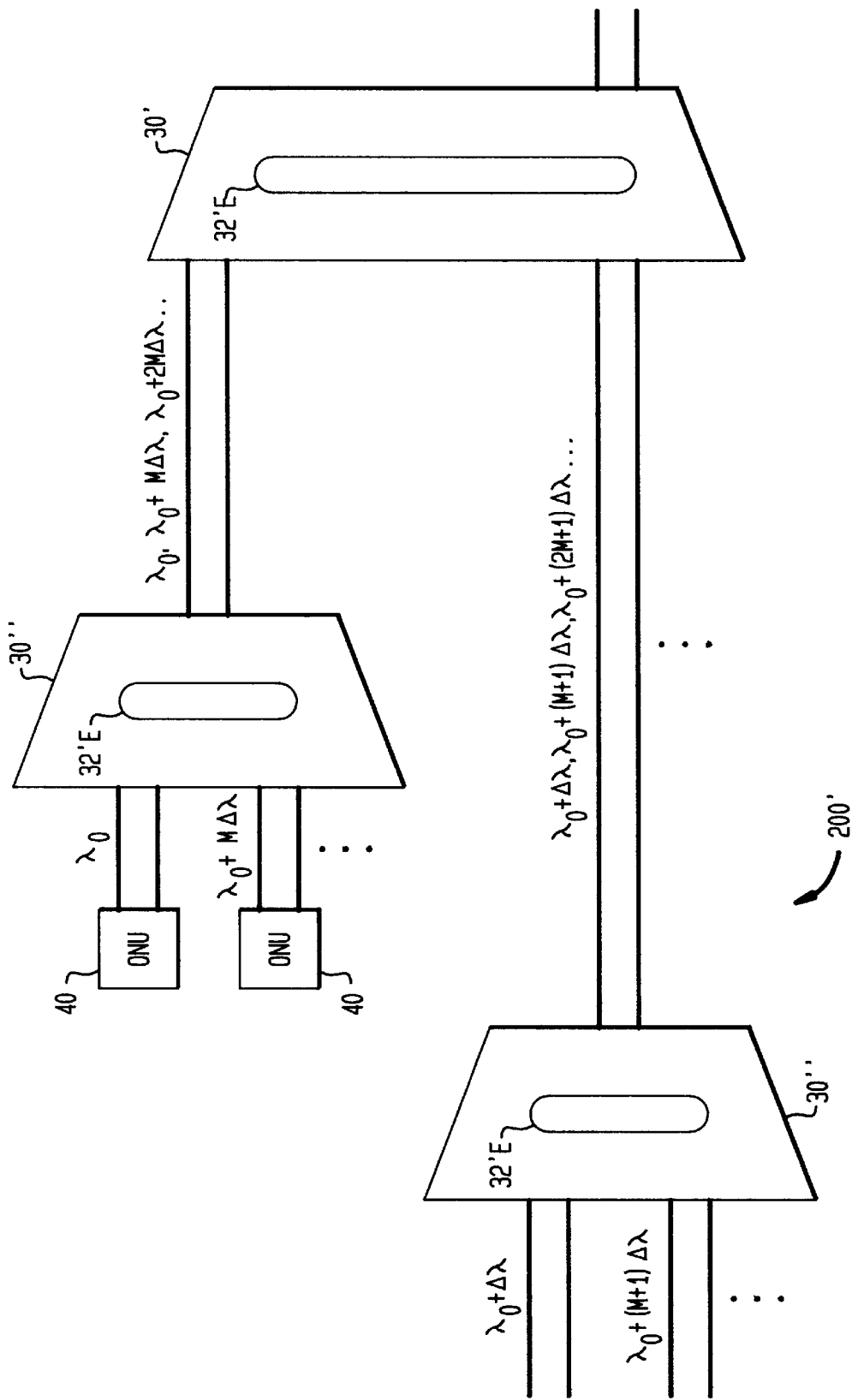
FIG. 7 is a schematic diagram highlighting a configuration within which an "equal channel spacing" operation is implemented.

In FIG. 6A, a first-order WGR 32V (at first-order remote node 30') is shown FIG. 6B shows the passband structure (i.e., channel spacings) of the first set of primary WGRs 32V at $RN_1$ (30), where the upper integer over each passband indexes the wavelength and the lower integer indexes the exit port number optically linked to central office 20. Each first-order remote node 30' is also coupled to each of a plurality of second-order remote nodes 30". Each second-order remote node includes a second-order WGR 32'V. As mentioned above, each first-order WGR 32V includes 11 ($N_1$) channels and each second-order WGR 32'V includes 9 ($N_2$) channels. The ratio of channel spacings $\Delta\lambda_1/\Delta\lambda_2$ between the first-and second-order nodes is 10/11. FIG. 6C shows the passband structure (i.e., channel spacings) of the first of the set of secondary WGRs 32'V, at $RN_2^{(1)}$ (tertiary star).

Assuming that signals displaying a wavelength $\lambda_0$ pass through port 0 of the WGR 32V at $RN_1$ (30') and port 0 of WGR 32'V at $RN_2^{(1)}$(30"), then signals with wavelengths $\lambda_{11}$, being 11 $\Delta\lambda_1$'s away from $\lambda_0$, also pass through port 0 of WGR 32V $RN_1$ (30'). However, because of the 10/11 ratio between the channel spacings of the first and second-order WGRs, the first-order signals will be 10 $\Delta\lambda_2$'s away from $\lambda_0$. Since $N_2 = 9$, signal $\lambda_{11}$ will exit from port 1 of WGR 32'V at $RN_2^{(1)}$ (30") when signals of wavelength $\lambda_0$ exit from port 0. It follows that $\lambda_{12}$, which is essentially $\lambda_0 + 11\Delta\lambda_1$, exits port 0 of WGR 32'V. Similarly, the depiction within FIG. 6D implies that the first port of WGR 32'V at $RN_2^{(2)}$ (30") will receive signals at wavelength $\lambda_1$, exiting from port 2 of WGR 32V of $RN_1$ (30'). In a similar way, signals $\lambda_1$, $\lambda_{12}$, et. seq., are passed from ports 1, 2, etc., of WGR 32'V of $RN_2^{(2)}$ (30").

The wavelength plan for the fourth case, the "equal channel spacing" case, will be explained with reference to FIG. 7. Therein is described a portion 200' of a multiple-star passive optical network 200, including first- and second-order remote nodes 30' and 30", each including first- and second-order WGRs 32E and 32'E, respectively. The free spectral ranges of the first- and second-order WGRs 32E and 32'E, located at first- and second-order remote nodes 30 and 30', respectively, differ, but the channel spacings of each are equivalent, i.e., $\Delta\lambda_1 = \Delta\lambda_2 = \Delta\lambda$. The first-order WGR 32E at the first-order remote node 30' is an M×M device, while the second-order WGR 32'E at the second-order remote node 30" is an (M−1)×(M−1) device. The free spectral ranges, MΔλ and (M−1)Δλ of the first-and second-order WGRs differ by one mode spacing, respectively. Such an arrangement results in a unique path for each of M(M−1) differing wavelength signals which can be launched along one fiber leaving a central office and directed to the first-order WGR.

To avoid confusion, the descriptions of the multiple star architecture to this point have neglected the return path, a distinguishing feature of RITE-Net™. The basic RITE-Net™ architecture includes pairs of optical fibers (one for downstream communication and one upstream communication) connecting the CO, the RNs and the ONUs. The discussions of the previous sections remain valid for the two-fiber case with the following provisos: first, each WGR must in fact be a 2N×2N device in order to serve N remote nodes or optical network units; second, the WGR channel spacing (Δλ) must be twice the WGR mode spacing, since every other router port will be dedicated to upstream traffic. With these conditions satisfied, the properties of the WGRs in conjunction with the passive loopback at the ONUs insure that the return path creates no additional frequency control overhead for the network.

Figure 8:
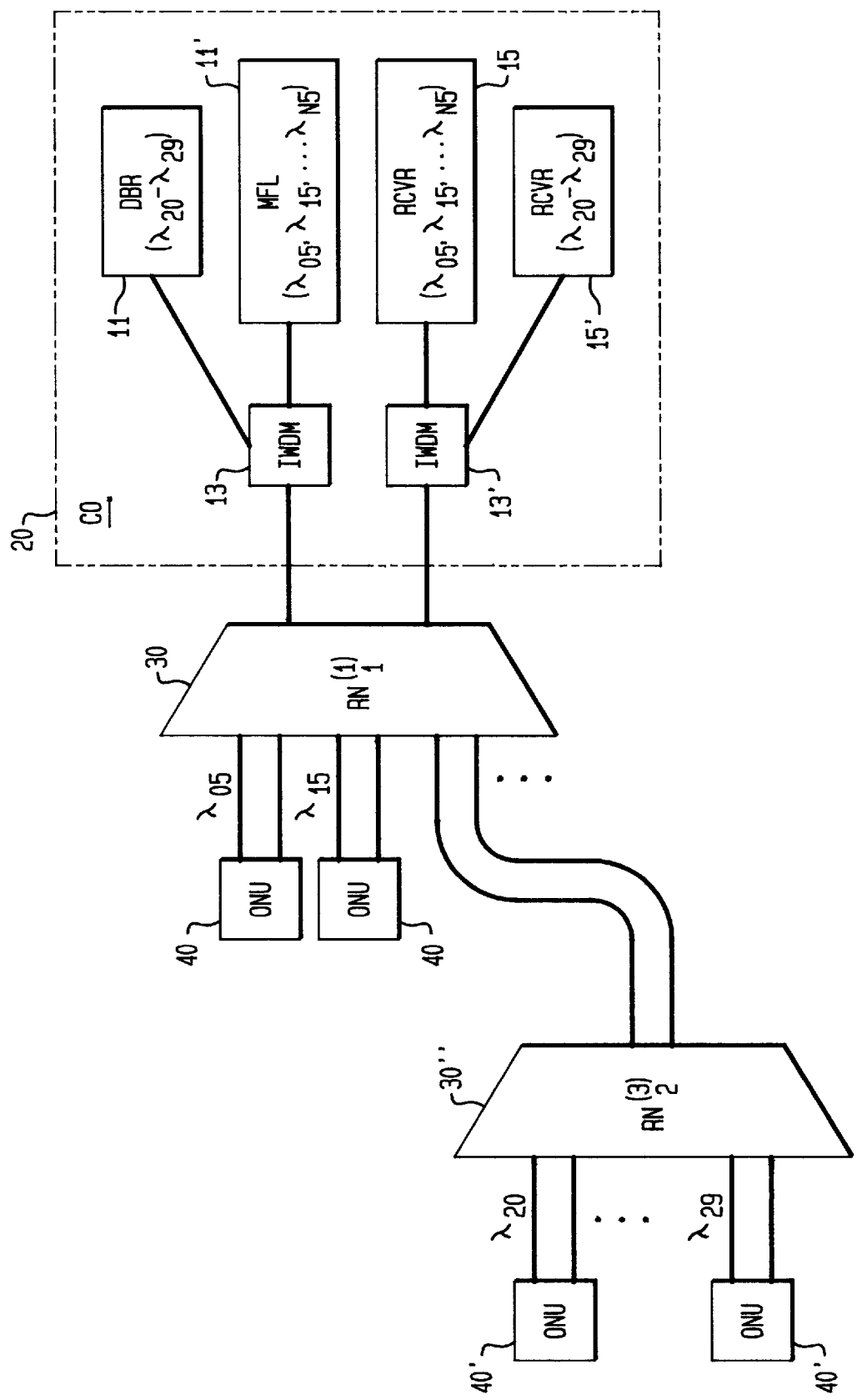
FIGS. 8, 9A and 9B are schematic diagrams of system applications of embodiments of the present invention.

System applications of embodiments of the present invention are shown in FIGS. 8 and 9. FIG. 8 shows a fiber-to-the-curb (FTTC) to a fiber-to-the-home (FTTH) conversion. The initial installation comprises a star of ONUs 40, some of which are shown. Conversion to FTTH is accomplished by selectively replacing ONUs 40 with a second level of RNs 30", and connecting a tertiary star of ONUs 40' to this RN. The system is upgraded as users demand higher bandwidth services, and extra laser resources are added at CO 20 as needed.

For the FTTC to FTTH conversion, it is assumed that the initial system will have a single laser (most likely a multi-frequency laser (MFL 11') and a coarse primary star (formed by RN 30 and ONUs 40). As the total throughput of the node increases, lasers and receivers can be added at CO 20 to keep electronic multiplexing economical. For example, modular conversion of ONUs 40 to passive RNs could be achieved by systematically splicing in tunable distributed Bragg reflectors (DBRs) 11 as each ONU is upgraded with a fine WGR (RN 30") to form another star. In essence, the channels of each DBR 11 see only the second order RN 30" and view it as if it were an RN for a conventional double star. The lasers could be coupled in with "intermediate" WDM (IWDM) 13 with only minimal loss by essentially tapping into the fiber's spectrum as needed. Such "IWDM splices" could be inexpensive dielectric filter components. Less desirable are systems in which resources must be added discontinuously, so that the number of lasers must be either 1 or K but nothing in between. Upstream signals are separated by IWDM 13' and provided to receivers 15 and 15' as shown.

Figure 9A:
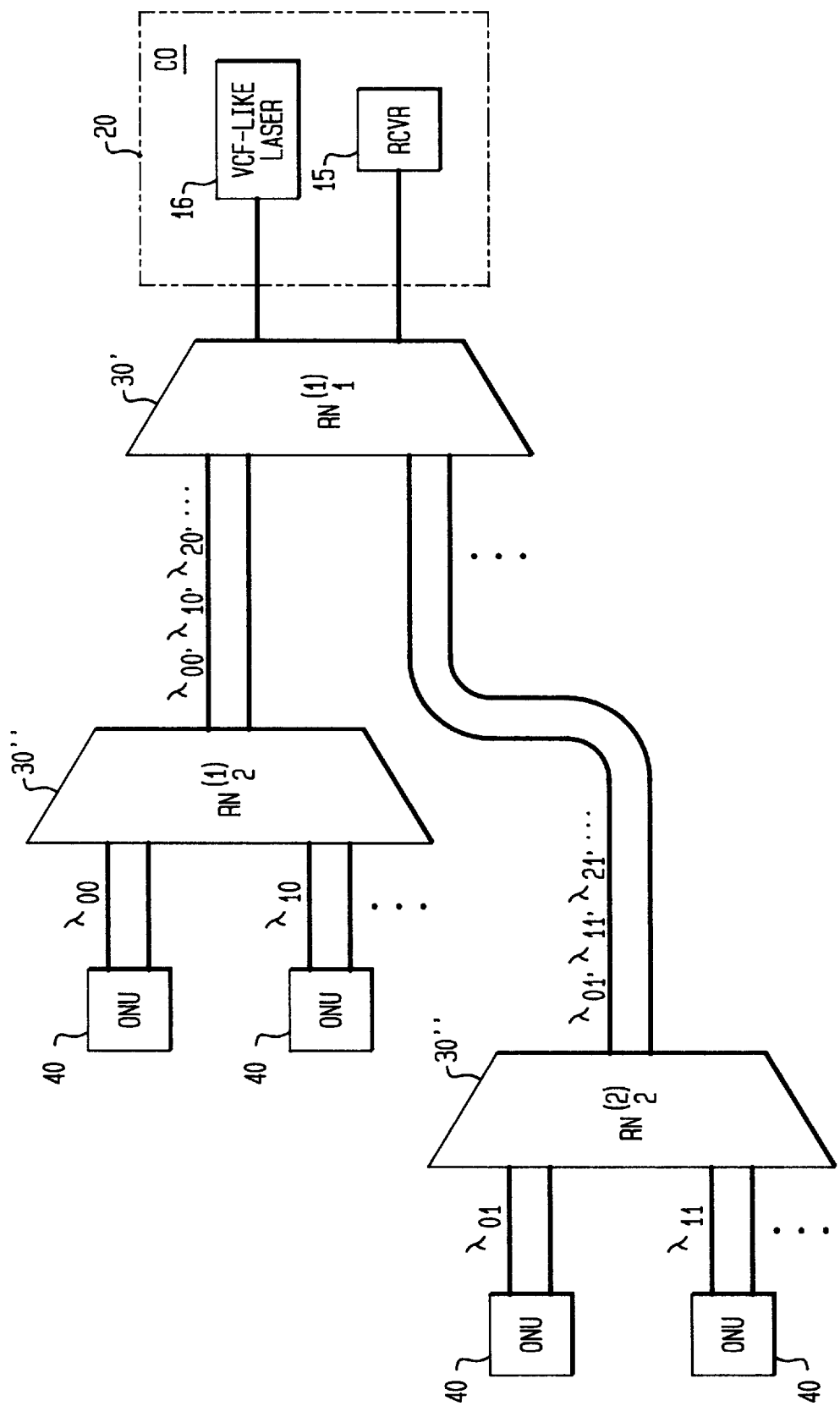
Figure 9B:
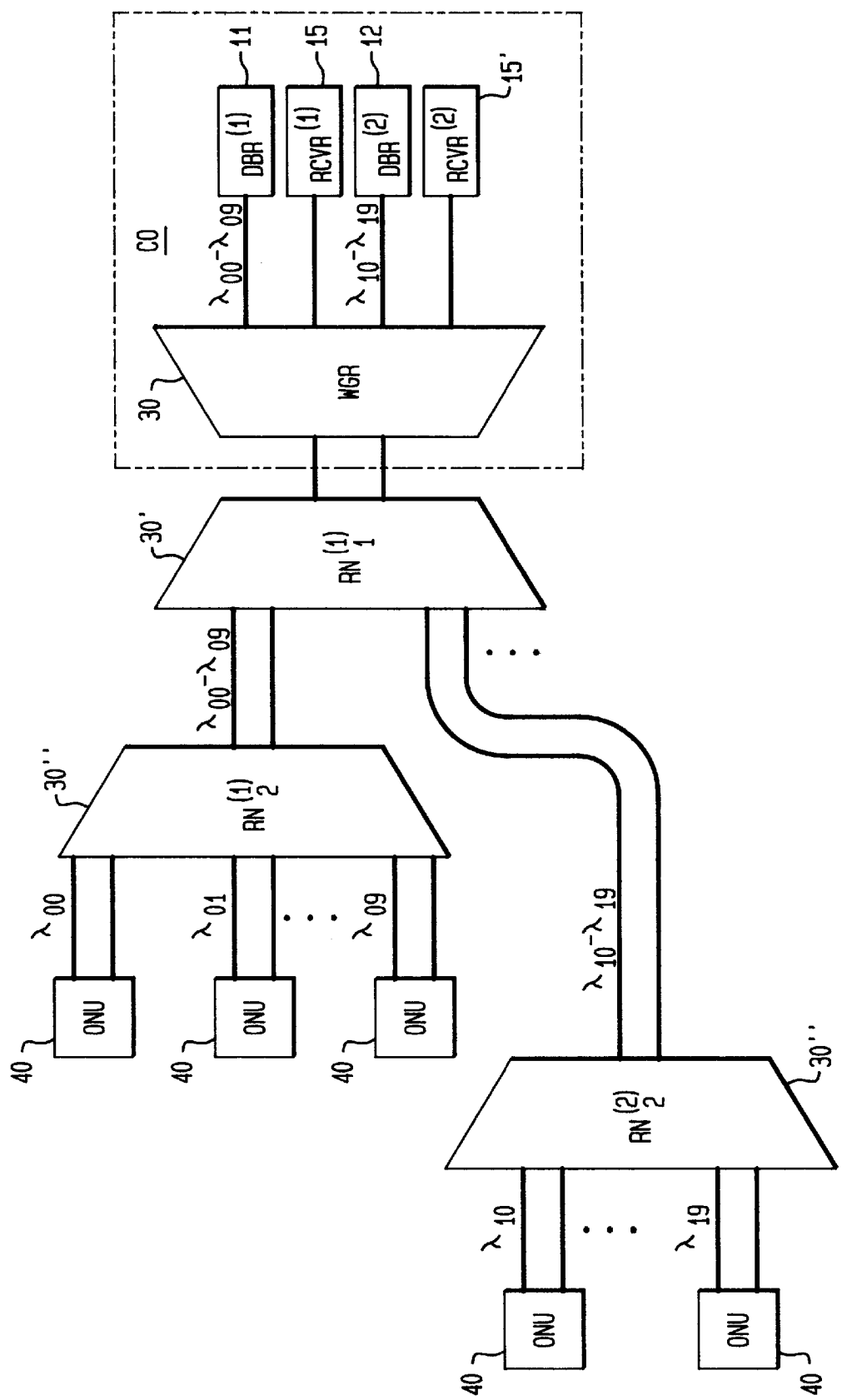

FIGS. 9A and 9B show two implementations of a fiber-lean FTTH network, for which the entire multiple star is installed from the beginning, thereby sharing CO plant costs over a large number of subscribers. For the fiber-lean network, the initial installation can have either a single laser or multiple lasers. The single-laser network (FIG. 9A) requires a laser (such as the vertical coupler filter (VCF) laser 16) with N modes capable of accessing each of the N subscribers over a broad wavelength range. This approach, which could take advantage of statistical multiplexing, may be suited to low-end services. The fine/coarse embodiment is most suited to this case, since the temperature-induced mode drift of the fine WGR can be tracked by temperature tuning the CO laser. An example of a multiple-laser fiber-lean network is shown in FIG. 9B. An additional WGR 30 located at CO 20 multiplexes the downstream optical signals from lasers 11 and 12 onto a single fiber, and demultiplexes the upstream data before detection. Each CO laser transmitter (e.g., DBRs 11 and 12) and CO receiver pair (e.g., RCVRs 15 and 15') is associated with a secondary WGR 30. In this case, the CO WGR 30 and WGR 30' in the primary RN can be identical coarse WGRs. A separate servo loop associated with each laser can track the thermal drift of each fine secondary WGR. A point which should be made regarding this approach is that it cannot efficiently take advantage of statistical multiplexing, since each laser cannot access each ONU.

Both the vernier and the equal channel configurations are resistant to multiple star implementations. If wide channel spacings are used in the stars, the tuning range is prohibitive for all but small sizes, and other architectures are preferable. If narrow channel spacings are used, the tuning range is within reason, but the environmental vulnerabilities dominate, since each laser must track two simultaneous (and possibly conflicting) routers.

Thus, for the applications of FIGS. 8 and 9, the combination of competing system requirements and available technology will favor certain implementations. Currently, none of the laser transmitter options described herein are commercially available in large numbers. Coarse/fine FTTC to FTTH conversion is the most attractive approach, but it requires an MFL for the initial installation. The uncertainty of VCF laser development (or development of a laser with similar functionality) will hinder the chances for the eventual deployment of all fiber-lean architectures that take advantage of statistical multiplexing.

What has been described herein is merely illustrative of the application of the principles of the present invention. Other arrangements and methods can be implemented by those skilled in the art without departing from the spirit and scope of the present invention.

What is claimed is:

1. A multiple star, passive optical network, comprising:
   a) a first optical node having a first-order optical router, the first order optical router having a periodicity property and defining $N_1$ channels with channel spacings approximately equal to $\Delta\lambda_1$, where $\Delta\lambda_1$ is about twice a mode spacing of the first optical router;
   b) at least one second optical node optically linked to said first optical node, the second optical node having a second order optical router, the second order optical router having a periodicity property and defining $N_2$ channels with channel spacings approximately equal to $\Delta\lambda_2$, where $\Delta\lambda_2$ is different than $\Delta\lambda_1$, and $\Delta\lambda_2$ is about twice a mode spacing of the second optical router;
   c) wherein said first and second-order optical routers each comprise:
      i) at least one pair of input ports comprising a first input port for receiving downstream optical signals and a second input port for providing corresponding upstream optical signals over the same wavelength band;
      ii) a plurality of pairs of output ports, each pair of output ports comprising a first output port for providing a downstream optical signal and a second output port for receiving a corresponding upstream optical signal over the same wavelength band, with each pair of output ports being associated with different wavelength bands due to said periodicity property;

iii) routing means for routing said downstream and upstream optical signals to said output and input ports, respectively, for output according to wavelength; and d) a plurality of remote optical network units, each having an optical transceiver comprising an optical receiver for receiving downstream optical signals outputted from said second optical node, a processor responsive to said optical receiver for processing upstream data and an optical transmitter responsive to said processor for converting upstream data into an upstream optical signal, wherein a portion of said downstream optical signal received at said transceiver is relayed to said optical transmitter to provide said upstream optical signal.

2. The optical network defined by claim 1, wherein said optical transmitter includes means for overmodulating said relayed portion of said downstream signal with said upstream data to provide said upstream optical signal.

3. The multiple star, passive optical network defined by claim 1, wherein said first-order optical router demultiplexes a downstream optical signal received at one of said input ports to form up to $N_1$ first-order downstream optical signals, and wherein each said first-order downstream optical signal is defined by a distinct set of one or more wavelength bands separated by a free spectral range approximately equal to $N_1 \Delta\lambda_1$.

4. The multiple star, passive optical network defined by claim 3, wherein each said second-order optical router demultiplexes one of said $N_1$ first-order downstream optical signals received at one of said second-order optical router input ports to form up to $N_2$ second-order downstream optical signals, and wherein each said second-order optical signal is defined by a distinct set of one or more wavelength bands separated by a free spectral range approximately equal to $N_2 \Delta\lambda_2$.

5. The multiple star, passive optical network defined by claim 3, wherein at least one wavelength band within at least one of said $N_1$ first order downstream optical signals is defined by a sequence of up to $N_2$ second order downstream signals which are contiguous in wavelength.

6. The multiple star, passive optical network defined by claim 3, wherein wavelength bands defining a plurality of second-order downstream signals are included within each of said $N_1$ first-order downstream signals.

7. The multiple star passive optical network defined by claim 1, wherein said channel spacing $\Delta\lambda_1$ of said first-order optical router is substantially an integer multiple of said channel spacing $\Delta\lambda_2$ of said second-order optical router, such that $\Delta\lambda_1$ approximately equals to $N_2\Delta\lambda_2$ or a multiple of $N_2\Delta\lambda_2$.

8. The multiple star, passive optical network defined by claim 1, wherein said channel spacing $\Delta\lambda_2$ of said second-order optical router is substantially an integer multiple of said channel spacing $\Delta\lambda_1$ of said first-order optical router such that $\Delta\lambda_2$ approximately equals $N_1 \Delta\lambda_1$.

9. The multiple star, passive optical network defined by claim 1, wherein said channel spacing $\Delta\lambda_1$ of said first-order optical router is a ratio of integers to said channel spacing $\Delta\lambda_2$ of said second-order optical router such that $(\Delta\lambda_1)$ MOD $(\Delta\lambda_2)$ is substantially non-zero.

10. The multiple star, passive optical network defined by claim 1, wherein said first-order optical node is optically linked to one of: a central office and/or a host digital terminal.

11. The multiple star, passive optical network defined by claim 10, wherein said first-order remote node is capable of serving up to $N_1 N_2$ distinct wavelength users.

12. A multiple star, passive optical network, comprising:

a) a central office including:
   i) a plurality of upstream/downstream optical signal ports;
   ii) at least one multiple wavelength, optical transmission means linked to at least one of said plurality of downstream optical signal ports; and
   iii) at least one optical receiving means linked to at least one of said plurality of upstream optical signal ports;

b) at least one first-order optical node optically linked to said central office for an exchange of upstream/downstream optical signals therebetween, said first-order optical node including a first-order optical router having a periodicity property and operative to demultiplex downstream optical signals applied to a first input port thereof to form and direct up to $N_1$ first-order downstream signals by wavelength to $N_1$ corresponding first output ports thereof, and for multiplexing up to $N_1$ first-order upstream signals at the same wavelengths as respective ones of said downstream signals and received at $N_1$ corresponding second output ports thereof to form and direct an upstream optical signal by wavelength to a second input port thereof, said first-order optical router having channel spacings $\Delta\lambda_1$ which is about twice a mode spacing of the first optical router; and c) at least one second-order optical node linked to said at least one first-order optical node, said second-order optical node including a second-order optical router having a plurality of input ports for an exchange of first-order upstream/downstream signals with said at least one first-order optical node, said second-order optical router having a periodicity property and operative to demultiplex said first order downstream signals to form and direct up to $N_2$ second-order downstream signals by wavelength to $N_2$ corresponding first output ports thereof, and for multiplexing up to $N_2$ second-order upstream optical signals at the same wavelengths as respective ones of said second order downstream optical signals and received at $N_2$ corresponding second output ports thereof to form and direct at least one first-order upstream optical signal by wavelength, said second order optical router having channel spacings $\Delta\lambda_2$ different from $\Delta\lambda_1$ and about twice a mode spacing of the second optical router;

d) wherein said upstream/downstream optical signals directed between said central office and said at least one first-order optical node are defined by essentially periodically spaced wavelength bands with a first band-to-band wavelength period, and wherein said first-order optical signals directed between said first- and second-order optical nodes are defined by periodically spaced wavelength bands with a second band-to-band wavelength period.

13. The network defined in claim 12, wherein said at least one multiple wavelength optical transmission means is defined by sequentially addressable wavelength bands.

14. The network defined in claim 12, wherein said at least one multiple wavelength optical transmission means is defined by simultaneously addressable wavelength bands.

15. The network defined by claim 12, further including at least one optical transceiver optically linked to said second-order optical node.

16. The network defined by claim 12, wherein said channel spacing $\Delta\lambda_1$ is substantially an integer multiple of said channel spacing $\Delta\lambda_2$ such that $\Delta\lambda_1$ approximately equals $N_2\Delta\lambda_2$.

17. The network defined by claim 12, wherein said central office includes at least two of said multiple wavelength optical transmission means.

18. The network defined by claim 17, wherein said central office includes a zeroth-order optical router optically linked to said at least two multiple wavelength optical transmission means, said zeroth-order optical router multiplexing downstream signals from said transmission means to form a zeroth order downstream optical signal.

19. The network defined by claim 18, wherein said zeroth-order optical router has approximately identical properties to said first-order optical router.

20. The network defined by claim 12, wherein said channel spacing $\Delta\lambda_2$ is substantially an integer multiple of said channel spacing $\Delta\lambda_1$ such that $\Delta\lambda_2$ approximately equals $N_1\Delta\lambda_1$.

21. The network defined by claim 12, wherein said channel spacing $\Delta\lambda_1$ is a ratio of integers to said channel spacing $\Delta\lambda_2$, such that $\Delta\lambda_1$ MOD $\Delta\lambda_2$ is substantially non-zero.

22. The network defined by claim 12, wherein one of said at least one first-order optical nodes is optically linked to at least one optical transceiver and said at least one second-order optical nodes is optically linked to at least one optical transceiver.

23. The optical network defined by claim 12, wherein said at least one second-order optical node is optically linked to at least one third-order optical node and each one of said at least one first-, second- and third-order optical nodes is linked to at least one optical transceiver.

24. The optical network of claim 12, wherein said at least one second-order optical node is optically linked to at least one third-order optical node and said at least one third-order node is optically linked to at least one fourth-order optical node.

* * * * *